United States Patent [19]
Braun et al.

[11] 3,764,599
[45] Oct. 9, 1973

[54] AMINO ALCOHOL DERIVATIVES OF AJMALINE

[75] Inventors: Klaus Braun; Günther Gabsch, both of Radebeul; Werner Förster, Halle; Rolf Ertel, Dresden; Klaus Femmer, Radebeul, all of Germany

[73] Assignee: VEB Arzneimittelwerk Dresden, Radebeul, Germany

[22] Filed: July 30, 1970

[21] Appl. No.: 59,700

[52] U.S. Cl. 260/247.2 R, 260/247.5 R, 260/293.53, 424/248
[51] Int. Cl. .............................................. C07d 87/40
[58] Field of Search ............... 260/293.53, 247.2 R, 260/247.5

[56] References Cited
UNITED STATES PATENTS
2,173,069   9/1939   Ulrich et al...................... 260/567.6

Primary Examiner—Alex Mazel
Assistant Examiner—Jose Tovar
Attorney—Nolte and Nolte

[57] ABSTRACT

Novel amino alcohol derivatives of ajmaline having the following formula

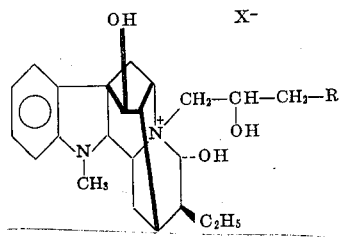

in which R is a primary or secondary aliphatic or cyclic amino group and X is the anion of an inorganic or organic acid having valuable therapeutic properties and in particular being characterized by antiarhythmic activity.

9 Claims, No Drawings

AMINO ALCOHOL DERIVATIVES OF AJMALINE

This invention relates to a novel series of amino alcohol derivatives of ajmaline having advantageous pharmacological properties and to methods of preparing and using the same.

More particularly, this invention relates to novel amino alcohol derivatives of ajmaline having the following formula

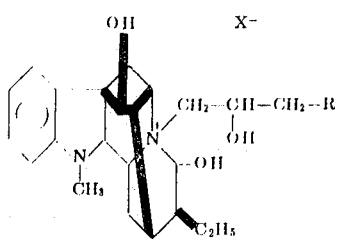

wherein R is a primary or secondary aliphatic or cyclic amino group and X is the anion of an inorganic or organic acid.

In DBP 1,154,120 and 1,196,207 there is described a process for preparing N-alkylated derivatives of ajmaline and particularly N-propylajmalinium salts. These compounds are prepared according to the disclosure of the aforesaid patents by reacting ajmaline with an unsubstituted alkyl halide and preferably with n-propylbromide.

In accordance with the invention, the novel amino alcohol derivatives of the above formula are prepared by reacting ajmaline with an amino substituted epoxy propane or an N-substituted 1-amino-3-halogen isopropanol and the resultant compound then reacted with an inorganic or organic acid to form the corresponding salt.

As inorganic or organic acid reaction component there may be used any of the non-toxic pharmaceutically acceptable acids as, for instance, hydrochloric acid, hydrobromic acid, sulfuric acid, acetic acid, phosphoric acid, citric acid, tartaric acid, oxalic acid, maleic acid and the like.

The starting materials are reacted in equimolar amounts or by using an excess of the epoxy compound or its precursor. The reaction is advantageously conducted in the presence of an alcohol, cyclic ether, chlorinated hydrocarbon or acetonitrile, and preferably at a temperature in the vicinity of the boiling point of the solvent used.

The compounds of the invention are possessed of valuable therapeutic properties and, for example, demonstrate a 10-fold stronger antiarhythmic activity then ajmaline. In comparison to the known N-propylajmaliniumbromide, or hydrogen tartrate which are possessed of a similarly high antiarhythmic activity, the compounds of the invention are much more readily tolerated and this is especially observed when the compounds of the invention are used in the form of intravenus injectable preparations.

The results of aconitin test procedures carried out in rats in which the compounds of the invention were compared were a known compound N-propylajmaline and ajmaline are set out in the following table.

In the procedures, the $ED_{20}$ represents that doses in mg/kg at which only isolated or sporadic ventricular-extra systoles occur.

TABLE 1

| Compound | $ED_{20}$ | $LD_{50}$ | Q |
|---|---|---|---|
| Example 2 | 0.19 | 5.5 | 23.2 |
| Example 1 | 0.31 | 6.0 | 19.3 |
| N-propylajmaline | 0.17 | 1.4 | 8.2 |
| ajmaline | 2.13 | 26.0 | 12.2 |

The compounds of the invention have also been found to have an effect on the circulation of the dog, for instance, the compound of Example 2, i.e., 4-(3-pyrrolidino-2-hydroxypropyl)-ajmalinium tartrate is markedly more effective as a circulation influencing agent than N-propylajmaline. The compounds of the invention, and in particular 4-(3-pyrrolidino-2-hydroxypropyl)-ajmalinium tartrate have, in amounts of up to 1 mg/kg, no effect on the blood pressure (Ps and Pd in mm Hg), the negative inotropic activity (isometric pressure increase rate in mm Hg/sec) is low and at a dose of 0.4 mg/kg (4-(3-pyrrolidino-2-hydroxypropylajmalinium tartrate) amounts to 14 percent while with N-propylajmaline this value amounts to 38 percent. The influence on the peripheral total resistance W is also satisfactory, i.e., within pharmacologically acceptable limits.

The results of the above can be appreciated from the following table.

TABLE 2

| | mg/kg | Ps | Pd | Hg/sec | W |
|---|---|---|---|---|---|
| Example 2 | 0.0 | 166 | 119 | 2 143 | 8 925 |
| Example 2 | 0.4 | 160 | 119 | 1 842 | 10 227 |
| Example 2 | 1.0 | 162 | 126 | 1 661 | 10 168 |
| N-Propyl-ajmaline | 0.0 | 189 | 133 | 2 393 | 11 264 |
| N-Propyl-ajmaline | 0.4 | 108 | 80 | 1 483 | 5 301 |

The following examples are given for the purpose of illustrating the invention and are in no way to be construed as limitative of the scope thereof.

EXAMPLE 1

7g Ajmaline were reacted with 2.8 g 1-diethylamino-2,3-epoxypropane in 50 ml ethanol for 6 hours at 75°C (bath temperature). The reaction solution was then evaporated to dryness using vacuum. The resulting residue was dissolved in absolute dioxane and the solution formed introduced into a column containing 60 g $Al_2O_3$. The derivative which was eluted with absolute dioxane was precipitated out of solution with etheric hydrochloric acid. The colorless hygroscopic precipitate which formed was filtered off under $N_2$ pressure, washed with dioxane and ether and dried in a vacuum disiccator.

There was recovered in 70 percent yield 4-(3-diethylamino-2-hydroxypropyl)-ajmalinium chloride-hydrochloride having a melting point of 165°–168°C (decomp.) $[\alpha]_D^{20} + 82°$ (ethanol). The corresponding tartrate melted at 123°–125.5°C (decomp.) $[\alpha]_D^{20} + 83$ (ethanol)

EXAMPLE 2

10g Ajmaline were heated together with 4.15g 1-pyrrolidino-2,3-epoxypropane in 75 ml ethanol for 16 hours at a temperature of 75°C (bath temperature). After one half of reaction time had elapsed, a further 1g epoxide was introduced into the reaction mixture.

The resulting reaction solution was evaporated to dryness under vacuum, the residue taken up in 100 ml acetone and the latter solution under stirring and ice cooling slowly poured into 5g D-tartaric acid in 300 ml acetone. The precipitate which separated out was washed with acetone and ether, then reacted with soda solution and extracted two times with 500 ml portions of ether. The dried residue of the ether extract was dissolved in 100 ml acetone, the acetone solution subjected to filtering and the filtrate under stirring and ice cooling poured into 3g D-tartaric acid in 300 ml acetone. The colorless crystals which formed were separated off by suction filtration and washed with acetone and ether.

There was recovered 4-(3-pyrrolidino-2-hydroxypropyl-ajmalinium tartrate having a melting point of 131°–133°C in a yield of 65 percent.

The corresponding chloride-hydrochloride melted at 187°–192°C (decomp.) $[\alpha]_D^{20} = +78°$ (ethanol).

The following compounds were prepared in the same manner.

| Example | R | X | M.P. | $[\alpha]_D^{20}$ in ethanol |
|---|---|---|---|---|
| 3 | Piperidino- | Cl | 183–188° | + 80° |
| 4 | Piperidino- | Tartrate | 134–137° | — |
| 5 | Morpholino- | Cl | 170–178° | + 24° |
| 6 | Morpholino- | Tartrate | 133–135.5° | — |
| 7 | iso-Propylamino | Cl | 179° | + 50° |
| 8 | Cyclohexylamino- | Cl | 193–197° | + 43° |
| 9 | Diisobutylamino- | Cl | 126–130° | + 57° |

What is claimed is:
1. An amino alcohol derivative of ajmaline having the formula

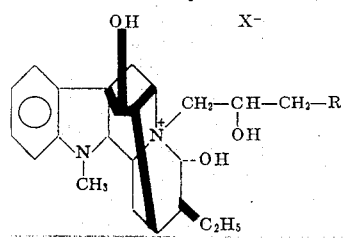

wherein R is iso-propylamino, diethylamino, diisobutylamino, cyclohexylamino, pyrrolidino, piperidino or morpholino and X is a non-toxic PHARMACEUTICALLY ACCEPTABLE anion of an inorganic or organic acid.

2. A compound according to claim 1 designated 4-(3-diethylamino-2-hydroxypropyl)-ajmalinium-chloride-hydrochloride.

3. A compound according to claim 1 designated 4-(3pyrrolidino-2-hydroxypropyl)-ajmalinium-tartrate.

4. A compound according to claim 1 designated 4-(3-piperidino-2-hydroxypropyl)-ajmalinium-tartrate.

5. A compound according to claim 1 designated 4-(3-morpholino-2-hydroxypropyl)-ajmalinium-tartrate.

6. A compound according to claim 1 designated 4-(3-iso-propylamino-2-hydroxypropyl)-ajmalinium-tartrate.

7. A compound according to claim 1 designated 4-(3-cyclohexylamino-2-hydroxypropyl)-ajmalinium-tartrate.

8. A compound according to claim 1 designated 4-(3-diisobutylamino-2-hydroxypropyl)-ajmalinium-tartrate.

9. A compound according to claim 1 designated 4-(3-diethylamino-2-hydroxypropyl)-ajmalinium-tartrate.

* * * * *